Sept. 30, 1958     K. J. KNUDSEN     2,854,619
TRANSFORMING UNIT
Filed April 19, 1956     2 Sheets-Sheet 1
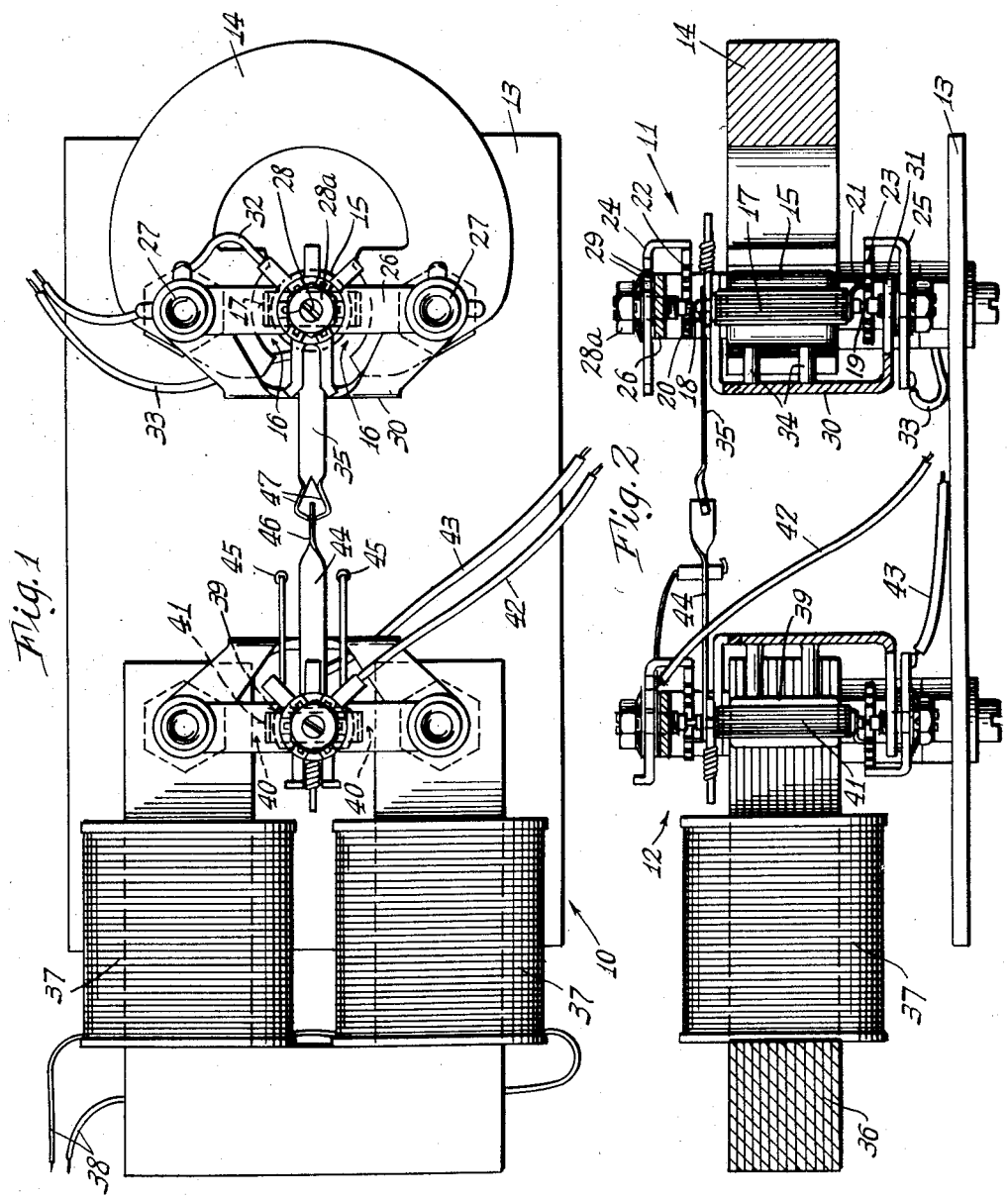
INVENTOR.
Knud J. Knudsen
BY
Johnson and Kline
ATTORNEYS Sept. 30, 1958 K. J. KNUDSEN 2,854,619
TRANSFORMING UNIT
Filed April 19, 1956 2 Sheets-Sheet 2
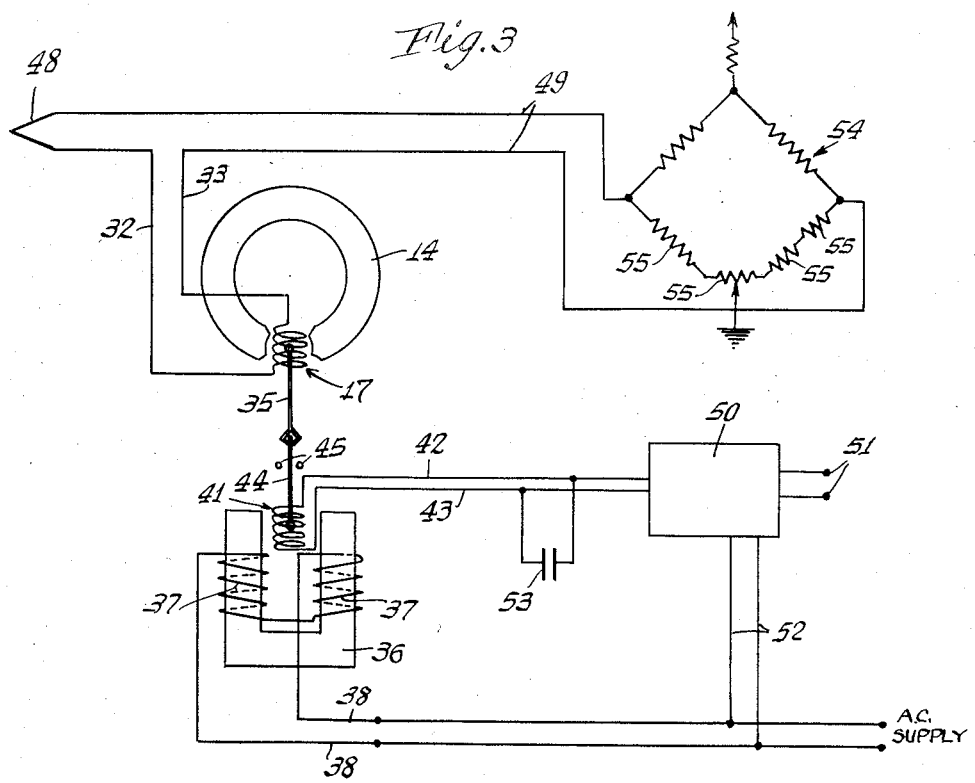
INVENTOR.
Knud J. Knudsen
BY
Johnson and Kline
ATTORNEYS

United States Patent Office 2,854,619
Patented Sept. 30, 1958

2,854,619

TRANSFORMING UNIT

Knud J. Knudsen, Woodbury, Conn., assignor to The Lewis Engineering Company, Naugatuck, Conn., a corporation of Connecticut Application April 19, 1956, Serial No. 579,238

10 Claims. (Cl. 323—46)

The present invention relates to a transforming unit that translates a direct current into an alternating current and more particularly to such a unit having a D'Arsonval movement which is responsive to the direct current for controlling the output of an electrodynamometer.

Heretofore, devices of the above type have not been satisfactory for use where they were subjected to rolling disturbances such as are encountered in airplanes or other vehicles because of the distortion in the A. C. output caused by the distrubances. In this prior known type of transforming unit, an angular displacement in the pivoted parts of the D'Arsonval movement is caused by the D. C. input with the amount of the displacement being proportional to the value of the input. The electrodynamometer has pivoted parts which are displaced the same angular amount by the D'Arsonval movement to produce an A. C. output proportional in value to the displacement and thus also to the value of the D. C. input. The rolling disturbances cause an angular acceleration and deceleration of the unit which creates angular displacement of the pivoted parts of the D'Arsonval movement and the electrodynamometer from the angular position dictated by the D. C. input and this displacement produces a distortion of the A. C. output so that it is not proportional to the D. C. input. Accordingly, the distortion renders these prior devices unfit for use in places where it is subjected to rolling distrubances. Additionally, the structure of prior devices prevented effective damping of the oscillations because the elements of the D'Arsonval movement and the electrodynamometer were so intermingled that any damping of one would render the other inoperative. Furthermore, in order to maintain the prior transforming units stable, i. e., operative, the sensitivity thereof was reduced such as to make them unsuitable for the minute D. C. input as is encountered in a thermocouple system.

It is accordingly, an object of this invention to provide a transforming unit of the above type in which the output is not distorted by rolling disturbances.

A further object of this invention is to provide a transforming unit in which the oscillation of the pivoted parts may be damped without rendering the unit inoperative.

Another object of this invention is to provide a unit of the above type which has sufficient sensitivity to enable it to be utilized in a thermocouple system but yet which retains its operativeness and stability.

In carrying out the present invention, a D'Arsonval movement and an electrodynamometer are employed with each being electrically and magnetically independent of the other but with only a mechanical connection between them so that an angular displacement of the coil in the movement creates a similar displacement in the coil of the electrodynamometer. Each of the coils is mounted on a separate pivot with the pivots being parallel while the mechanical connection consists of an arm mounted on each coil for rotation therewith and with a sliding interconnection between the arms. Each coil and arm is statically balanced about its own pivot and in addition each coil and arm has the same dynamic mass so that the output of the transforming unit is not distorted by an acceleration or rapid motion thereof from one relative position to another. Furthermore, by reason of having the elements only mechanically connected, the oscillations of the D'Arsonval movement can be electrically damped by means of a resistive load without interfering with the operation of the electrodynamometer.

Another feature of the present invention resides in having an impedance connected in the A. C. output which makes the transforming unit more sensitive, yet maintains its stability. By connecting a capacitive reactance in the output, the current in the electrodynamometer or A. C. coil is made to have a leading phase angle with the A. C. output voltage with the result that it produces a torque which aids the torque produced by the D'Arsonval movement in opposition to the normal mechanical restraining torque of the coils.

Other features and advantages will hereinafter appear.

In the accompanying drawing:

Figure 1 is a plan view of the transforming unit of the present invention.

Fig. 2 is an elevation, partly in section, thereof.

Fig. 3 is a schematic diagram showing one application of the instant invention.

Referring to Figs. 1 and 2 there is shown, enlarged, the specific embodiment of the present invention which is indicated generally by the reference numeral 10. The D'Arsonval movement or direct voltage input means is indicated generally by the reference numeral 11 while the electrodynamometer or A. C. output means is referred to by the reference numeral 12. While other known D'Arsonval movements may be utilized, the input means 11 in the instant embodiment is mounted on a base plate 13 and has a permanent magnet 14, shown as a horseshoe to provide a unidirectional magnetic flux. A ferromagnetic core 15 is positioned between the ends of the magnet 14 and the ends of the magnet and the core 15 are shaped to provide arcuate air gaps 16. A coil 17 is located for pivotal movement in the air gaps 16 and is provided with an upper pivot pin 18 and a lower pivot pin 19. A link 20 is attached to the upper pivot pin 18 and has a bent portion to which is secured the inner end of a spiral spring 22. The outer end of the spring 22 is attached to one leg of an upper elbow 24 to maintain the outer end stationary. The lower pivot pin 19 is similarly provided with a link 21, a spring 23 and an elbow 25. As the coil rotates from the desired no voltage position, it is opposed by the torque resistance of the springs 22 and 23.

A bar 26 is fastened on the upper surface of the permanent magnet 14 by rivets 27 and is threaded intermediate its length to receive a screw 28. The lower surface of the screw serves as the pivot bearing for the upper pivot pin 18. The elbow 24 is maintained in position by the screw 28 in conjunction with a bolt 28a but is insulated therefrom by insulating washers 29. A plate 30 is also connected to the permanent magnet 14 by the rivets 27 and has an inturned portion 31. The inturned portion is threaded to support a screw having a bearing surface for the lower pivot pin 19 in the same manner as that explained for the upper pivot pin 18. Also a bolt is provided to maintain the elbow 25 in position and insulating washers are utilized similarly.

A pair of leads 32 and 33 are connected to the elbows 24 and 25 respectively for conducting current through the coil 17. Current will flow from the lead 32, elbow 24, spring 22, link 20 and through the coil 17 to the link 21, spring 23 and elbow 25 to the lead 33. To hold the core 15 in position the plate 30 has supporting elements 34. An arm 35 is carried by the coil 17 adjacent the upper pivot pin and moves with the coil.

Normally, with no voltage on the coil 17, the arm 35 is caused to assume the central position or no voltage position shown in Fig. 1 by the springs 22 and 23. When a current is passed through the coil 17 of one polarity, a flux is induced therein which magnetically coacts with the permanent magnet flux in the air gap 16 to provide angular displacement of the coil 17 and consequently the arm 35 in opposition to the restraining torque of the springs. Moreover, if the current is reversed the arm will move in the other direction since the induced flux will be in the opposite direction.

While the electrodynamometer may be of known construction, in the instant embodiment the output means 12 is mounted on the base plate 13 and has a rectangular, C-shaped, laminated iron core 36 with leg portions encompassed by two windings 37. The windings have leads 38 for connection to an A. C. source to provide an alternating magnetic flux in the core. A small, laminated ferromagnetic core 39 is positioned within the opening adjacent the ends of the core 36 to provide air gaps 40. While the shape of the air gaps is substantially rectilinear, it is obvious that they may be of a different shape depending on the desired concentration of flux and other factors. A coil 41 is positioned for pivotal movement in the air gap 40 in a manner identical to that of coil 17 as previously explained. Both the coil 17 and the coil 41 are mounted so that their pivots are perpendicular to the base plate 13 and hence the pivots are parallel to each other. Two leads 42 and 43 are connected to the coil 41 like the leads 32 and 33 are connected to the coil 17 and these leads 42 and 43 constitute the output leads of the transforming unit. An arm 44 is also connected to the coil 41 for movement therewith while limit stops 45 control the magnitude of displacement of the arm. The stops 45 are of particular importance when the present invention is utilized in jet aircraft since they constitute a means for preventing overloading of the system upon initial starting when the maximum displacement occurs. The limit stops can be adjusted to limit the maximum amount of output from coil 41 by merely limiting the magnitude of the displacement of the arm 44.

The arms 35 and 44 serve as the only connection between the two means 11 and 12 and since they both rotate, a sliding connection therebetween is provided. Accordingly, the arm 44 has an end portion 46 which is bent 90° to the remainder of the arm while the arm 35 has an end portion 47 which is slit and curved to form a slot into which the portion 46 is located, though other sliding mechanical connections may be employed if desired. The arms 35 and 44 are mounted to be diametrically opposed so that with no current through the coil 17, i. e., the no voltage position, the arms are in the same vertical plane, which plane also passes through the pivots of the coils 17 and 41.

The coil 41 is positioned in the A. C. flux path produced by the coil 37 and the core 36 so that in its no voltage position, shown in Fig. 1, the plane of the turns of the coil 41 are parallel to the alternating magnetic flux lines with the result that there is no flux linkage and thus no induced voltage. As the coil 41 rotates between the limits set by the stops 45, its turns will have induced therein an alternating curent which is substantially proportional to the angular displacement from the no voltage position. The voltage produced in the coil is a function of its angular position and also the flux density in the air gaps and for small angular displacements of the coil 41, the voltage is substantially directly proportional to the degree of angular displacement from the no voltage position. Moreover, with an opposite movement of the coil 41 from the no voltage position, a voltage proportional to the displacement is induced but a 180° phase reversal occurs.

It will be apparent that by proper selection of the size of the windings 37 and the size of the core 36 and the coil 41 and the shape of the air gaps therewith, the output of the coil 41 can be altered over a large range to give the desired magnification with respect to the direct current in the coil 17.

In aircraft installations or in marine vehicles it is essential that rolling motions, as for example when a ship rolls, do not effect a displacement of the coils away from their proper location. Since the coils are pivotally mounted to respond to minute currents and because they have inertia they would naturally be susceptible to any such disturbing action which causes the transforming unit to rotate from one poistion to another. However, the effect of any such action on the coils has been completely eliminated by making the two coils and arms of the same dynamic mass and by making the arms extend toward each other. Thus, if such action takes place, both coils would tend to rotate in the same direction, either clockwise or counterclockwise, but since the arms are coupled together and both arms and coils have the same dynamic mass the one counterbalances the other with the net effect that no movement takes place. Each coil and arm is statically balanced on its pivot so that a disturbance which moves the transforming unit from one relative position to another in a straight line does not angularly displace the arms. Thus, for example, if the transforming unit is mounted on an airplane so that the base plate 13 is vertical and the pivots of the unit are parallel to the longitudinal axis of the plane, then when the airplane rotates about this axis as when doing a barrel roll, the unit is subjected to a rolling disturbance. However, no distortion in the output is realized as the disturbing forces may be resolved into straight line motion and rotating motion, the straight line motion having no effect since the coils are statically balanced and the rotating motion having no effect because of the coils and arms being of the same dynamic mass and any tendency of one to rotate is opposed by the other.

Shown in Fig. 3 is a schematic illustration of the unit 10 as used in a temperature responsive system of the type commonly employed in aircraft. In such a system it is desired to have the temperature constant at a particular location and any deviation therefrom to actuate mechanism to cause the temperature to be corrected back to the desired temperature. Accordingly, it is necessary to have both the magnitude of the temperature change and its direction be sensed and transmitted to the appropriate actuating mechanism. A hot junction of a thermocouple is shown indicated by the reference numeral 48 and is connected by leads 49 to a thermocouple compensator 54 such as is disclosed in my copending application Serial No. 534,346, filed September 14, 1955. When the hot junction 48 is at the desired temperature there will be no current flowing in the leads 49. The leads 32 and 33 connect the coil 17 in the line and thus when there is current flowing through the system caused by any unbalance thereof, the coil 17 will have current flowing therethrough, will be angularly displaced and will move the arm 35. The thermocouple compensator has a plurality of small value resistors 55 which aid in damping any oscillations of the coil 17. If the coil 17 were to oscillate an alternating voltage would be induced therein which would cause an alternating current to flow in the circuit including elements 33, 49, 55, 48 and 32. If the coil 17 oscillates it acts as a generator and the resistors 55 forming a low resistance path act as a load which opposes the oscillating motion, thus serving to dampen the oscillations of the transforming unit.

The arm 35 moves the arm 44 and the coil 41, and the coil 41 will have induced therein an alternating voltage in proportion to the degree of movement of the arm 35. Also the phase relationship of the voltage with respect to the alternating flux will be indicative of the direction of movement from the no voltage position. The output leads 42 and 43 are connected to an amplifier 50 which amplifies the signal produced by the coil 41 and transmits it by lines 51 to servo-mechanism (not shown) which serves to alter factors in order to have the temperature corrected to the desired value and/or control a visible indicator if desired. Leads 52 connect the amplifier 50 to a source of A. C. supply (not shown) and also the A. C. supply is connected to the coils 37 by the leads 38 for producing the alternating magnetic flux. The A. C. supply may be 400 cycle, 28 volt, of the type that is common in aircraft.

In order to increase the sensitivity and yet retain the stability, a condenser 53 is positioned across the output leads 42 and 43. This condenser causes the current in the coil 41 to be slightly leading with respect to the induced voltage in the coil. The current produces a flux in the coil which has a component in phase with the magnetic flux in the air gap so that the fluxes coact to produce a torque tending to rotate the coil against the torque action of the springs in the input means 11 and output means 12. If this condenser is of too large a value, it will cause a too leading current to flow in the coil 41 which would produce a torque greater than the spring torque and force the coil to its outermost positions, i. e., with the arm 44 against the stops upon the slightest deflection from the no voltage position and consequently, an unstable system. If the condenser is too small or is not utilized, the current in the coil 41 will lag the induced voltage and produce a torque aiding the springs and thus the coil will strongly seek its no voltage position to cause insensitivity in the system. By selecting the value of the condenser 53 so that the current is leading but not sufficiently to completely offset the mechanical restoring means (the springs) the greatest degree of sensitivity with stability is attained.

The friction introduced by the use of four pivots is insignificant where vibration is present. However, if desired, the pivots may be replaced with suspension ligaments with the elimination of friction error.

From the foregoing, it will be apparent that the power in the D. C. coil 17 through its displacement of the arm 35 and consequent action on the arm 44 and coil 41 are greatly magnified into the A. C. output of the coil 17. For example, with one embodiment, with the D. C. power of 10 micromicrowatts in the coil 17 an A. C. power output from the coil 41 of 1.6 microwatts was realized and the gain was 160,000.

By having the moving D. C. current coil 17 and its arm of the same dynamic mass as the coil 41 and its arm 44 and by mounting the pivots for these coils in the same plane, vertical in the specific embodiment shown, the transforming unit of the present invention is unaffected by disturbances which would tend to angularly move the coils about their axes.

Variations and modifications may be made within the scope of the claims and portions of the improvements may be used without others.

I claim:

1. A transforming unit for translating and amplifying a D. C. power into a larger A. C. power comprising input means, including a balanced pivoted element, for producing a movement of the element in proportion to the D. C. power input, whereby the amount of angular movement of the pivoted means and pivoted element remains substantially constant when the transforming unit is subjected to acceleration caused by external forces; output means responsive to said movement for producing an A. C. power proportionate in magnitude to the amount of movement and including balanced pivoted means moved by said element; the pivoted element and the pivoted means being mounted on independent pivots which are parallel, whereby the output power is substantially independent from extraneous forces causing movement of the transforming unit from one position to another.

2. A transforming unit for translating and amplifying a D. C. power into a larger A. C. power comprising input means including a pivoted element for producing an angular movement of the element in proportion to the D. C. power input; output means responsive to said movement for producing an A. C. power proportionate in magnitude to the amount of movement and including pivoted means angularly moved by said element; the pivoted element and the pivoted means being mounted on independent pivots which are parallel and the pivoted element and the pivoted means having the same dynamic mass.

3. The invention as defined in claim 2 in which there are means for slidingly interconnecting the pivoted element and the pivoted means with the line of contact being equidistant from the pivots of the element and means.

4. A transforming unit for translating and amplifying a D. C. power into a larger A. C. power comprising input means including a pivoted element for producing an angular movement of the element in proportion to the D. C. power input; output means responsive to said movement for producing an A. C. power proportionate in magnitude to the amount of movement and including pivoted means angularly moved by said element; the pivoted element and the pivoted means being mounted on independent pivots which are parallel; and in which the pivoted element includes an arm and the pivoted means includes an arm with the arms extending toward each other, whereby the output power is substantially independent from extraneous forces which cause movement of the transforming unit from one relative position to another.

5. The invention as defined in claim 4 in which the pivoted element and the pivoted means have the same dynamic mass and have their end portions slidingly interconnected equidistant from the pivots.

6. The invention as defined in claim 5 in which means are provided, one on each side of the no voltage portion of one of the arms for defining the maximum movement of the arms.

7. A transforming unit for translating a direct current into an amplified alternating current comprising first means including a pivoted arm for translating the direct current into an angular displacement of the arm, the degree of angular displacement being proportional to the value of direct current; second means including a coil pivoted in an alternating flux path and having a member attached thereto connected to the pivoted arm for angularly displacing the coil by the arm to produce an A. C. output proportionate in value to the amount of displacement; spring means normally maintaining the arm and member in a no voltage position and for opposing any angular movement from such position; and means connected to the output of the coil for producing a force which aids in moving the member from its no voltage position against the opposition of the spring means.

8. The invention as defined in claim 7 in which the force of the last named means is only slightly less than the force of the spring means whereby the transforming unit maintains its stability but increases its sensitivity.

9. The invention as defined in claim 7 in which there are means for normally positioning the first and second means in a no voltage position and in which displacement of the coil in one direction from the no load position causes a 180° phase reversal of the A. C. output.

10. A transforming unit for translating and amplifying a D. C. power into a larger A. C. power comprising input means including a balanced pivoted element for producing an angular movement of the element in proportion to the D. C. power input; output means responsive to said movement for producing an A. C. power proportionate in magnitude to the amount of angular movement and including balanced pivoted means moved by said element; said pivoted element and the pivoted means having the same dynamic mass and being mounted on independent parallel pivots, whereby external forces which cause the transforming unit to be angularly accelerated are ineffectual to alter the amount of angular movement of the element; spring means connected to the pivoted element and the pivoted means for normally maintaining the element and pivoted means in a no voltage position and for resisting angular displacement therefrom; and means for damping the oscillation effect of the springs.

References Cited in the file of this patent

UNITED STATES PATENTS

| | | |
|---|---|---|
| 2,368,701 | Borden | Feb. 6, 1945 |
| 2,446,390 | Rath | Aug. 3, 1948 |
| 2,681,975 | Leonard | June 22, 1954 |